United States Patent
Cooper

(10) Patent No.: US 8,214,355 B2
(45) Date of Patent: Jul. 3, 2012

(54) SMALL TABLE: MULTITENANCY FOR LOTS OF SMALL TABLES ON A CLOUD DATABASE

(75) Inventor: Brian Frank Cooper, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 333 days.

(21) Appl. No.: 12/702,954

(22) Filed: Feb. 9, 2010

(65) Prior Publication Data

US 2011/0196866 A1  Aug. 11, 2011

(51) Int. Cl.
G06F 7/06 (2006.01)
G06F 17/30 (2006.01)

(52) U.S. Cl. ......... 707/717; 707/737; 707/769; 707/973

(58) Field of Classification Search ........... 707/999.003, 707/999.004, 999.101, 999.102, 999.107, 707/713, 717, 737, 769, 969, 971, 972, 973
See application file for complete search history.

(56) References Cited

U.S. PATENT DOCUMENTS

| | | | |
|---|---|---|---|
| 7,844,601 B2 * | 11/2010 | Seeds | 707/722 |
| 2007/0201700 A1 * | 8/2007 | Hacigumus | 380/277 |
| 2009/0144220 A1 | 6/2009 | Feng et al. | |
| 2009/0144252 A1 * | 6/2009 | Koch et al. | 707/4 |
| 2009/0144333 A1 | 6/2009 | Feng et al. | |

OTHER PUBLICATIONS

"Multi-Tenant Dataabses for Software as a Service: Schema-Mapping Techniques" by Aulbach et al, SIGMOD '08, 2008.*

* cited by examiner

*Primary Examiner* — James Trujillo
*Assistant Examiner* — Bruce Moser
(74) *Attorney, Agent, or Firm* — Weaver Austin Villeneuve and Sampson LLP

(57) ABSTRACT

Methods and apparatus are described for partitioning native tables in a database cluster into logical tables. Each logical table is mapped into a unique portion of the native table by an intermediary server. Clients access a logical table as an ordinary, full-fledged database table through the intermediary server, which translates queries on the logical table into queries on the corresponding portion of the native table. The mapping may use the application name, logical table name, and a version number to create a native table key for each key in the logical table. A data structure storing these mappings may be stored at the intermediary server or in a native table in the database. This approach affords clients quick and flexible access to the database with better data integrity and security than native tables allow.

19 Claims, 5 Drawing Sheets

SMALL TABLE: MULTITENANCY FOR LOTS OF SMALL TABLES ON A CLOUD DATABASE

BACKGROUND OF THE INVENTION

The present invention relates to databases, and more specifically to lightweight partitioning of a database for multiple clients.

The rise of web services has greatly increased data storage needs. In response, a number of companies have developed cloud database systems, which are databases running on clusters of multiple machines (also known as a cloud). These systems generally provide greater reliability, throughput, and processing power than traditional databases. Machines can be added to the cluster as needed, allowing the databases to grow as large desired. Examples of cloud databases include Yahoo's Sherpa, Google's BigTable, Amazon's SimpleDB, Microsoft's Azure, and Facebook's Cassandra, among others.

Typically, cloud database systems sacrifice flexibility and access control to achieve their performance goals. In traditional databases, each application would create its own table (or even multiple tables) in the database. This prevents one application from accidentally overwriting another's data. It also allows enforced separation with access control, where the ability to update or even read data can be restricted on an application by application basis. By contrast, systems such as Google's BigTable create a single database table across all machines in the cluster. Different applications using BigTable share one table for all their data. This requires coordination between applications to prevent collisions of database keys and other inadvertent or intentional data corruption.

Other cloud databases allow multiple tables, but in very inflexible ways. For instance, creating a new table on Yahoo's Sherpa database cluster is a very expensive operation. Space for the new table must be allocated in the cluster. Every machine must be updated with the new table information before the table can be accessed to prevent data corruption. This update may involve hundreds or thousands of machines, any of which may be unavailable for extended periods of time due to heavy workloads or system maintenance. In some cases, such as Facebook's Cassandra, adding a new table may require shutting down and restarting the entire cluster, which may not be feasible for clusters supporting always-on 24/7 internet services. Other systems trade one type of inflexibility for another. For example, new tables may be created cheaply and easily, but at the cost of fixed table layouts and column types which do not support arbitrary data storage for many different types of applications.

SUMMARY OF THE INVENTION

According to the present invention, methods, system, and storage media are presented for partitioning a native table in a database into one or more logical tables. An intermediary server receives a first query directed to a logical table from an application on a client device. The logical table is not recognized as a table by the database, which understands native tables. The intermediary server translates the first query into a second query recognized by the database. The translation maps the logical table into a portion of a native table using an entry corresponding to the application and the logical table in a mapping data structure. The intermediary server retrieves data from the portion of the native table corresponding to the logical table using the second query. The data is returned to the client in a response which appears to answer the first query directed to the logical table.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, native tables in a cluster database may be partitioned into logical tables. Where native tables are expensive to create and manage, the logical tables provide a lightweight alternative. Each logical table is mapped into a portion of a native table by translating keys in the logical table into unique keys in the native table. Incorporating one or more of the application name, the logical table name, and a version number into the translated native table key prevents name collisions between different logical tables and applications. An intermediary server mediates client interactions with the database. By translating client queries using the described techniques, the intermediary server can make the logical tables appear as normal, full-fledged database tables to the clients. Further, the cluster database does not require any knowledge of the logical tables, which are maintained by the intermediary server. This allows the intermediary server to be used with existing cluster databases and clients without modification.

Figure 1:
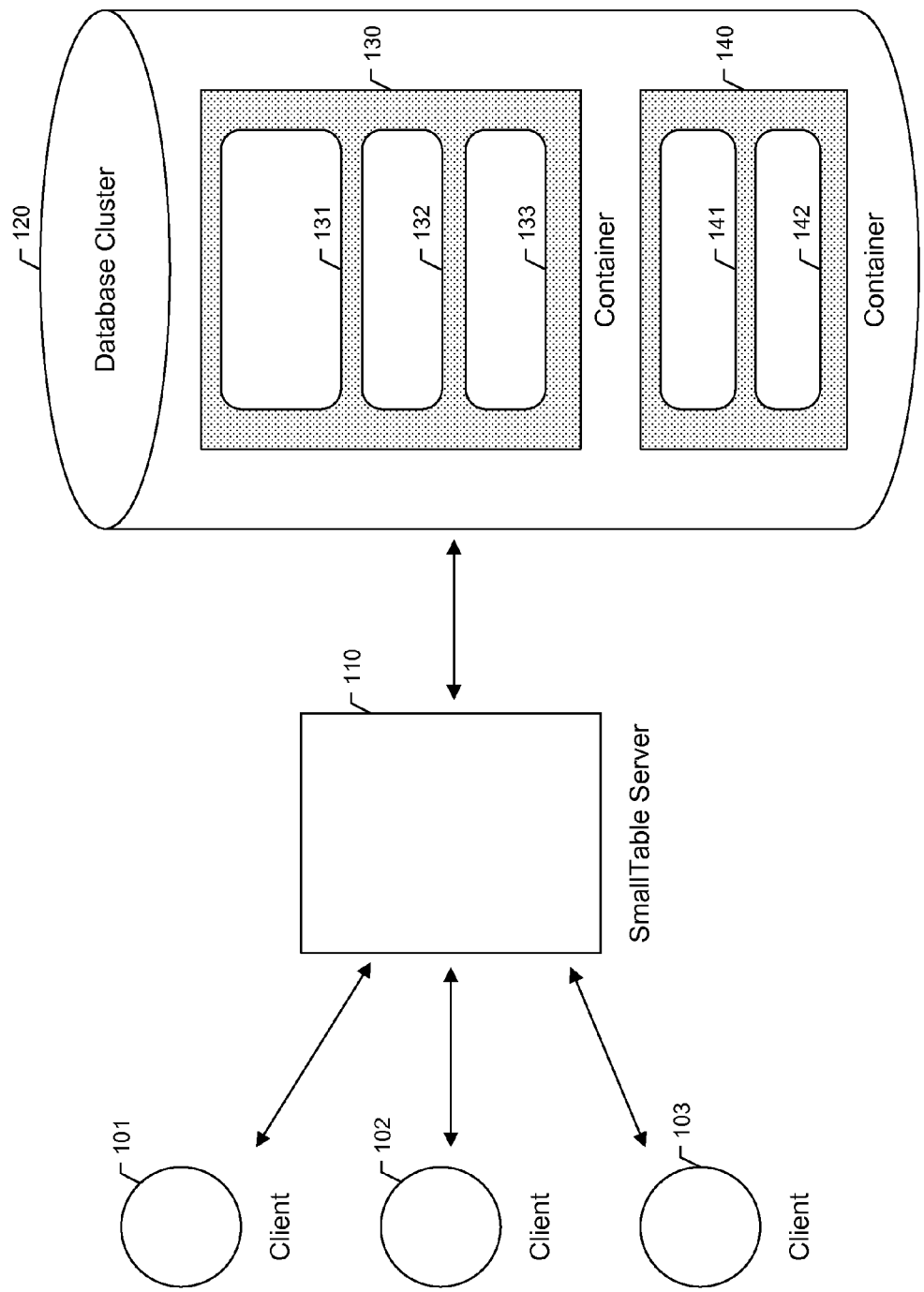
FIG. 1 depicts an exemplary system according to certain embodiments of the invention.

FIG. 1 depicts an exemplary setup according to certain embodiments of the invention. Clients 101-103 require access to a database for storing and retrieving data. Typically the clients are applications running in a data center, such as Yahoo! Mail or Yahoo! Finance, but can include any application on any type of computing device. Database cluster 120 provides database storage suitable for high-volume, high-availability services. Such databases run on clusters of machines which may be spread across one or more data centers. Cluster database software such as Yahoo's Sherpa organizes the machines to provide scalable, high-bandwidth, low-latency, fault-tolerant storage through a conventional database interface. Other types of cluster database software may be run on the cluster as well.

Database cluster 120 contains two tables 130 and 140. These are native tables recognized and managed by the database cluster software. Such tables will be referred to as containers. As already discussed, creating native database tables in such clusters can be an expensive operation. However, the lack of a lightweight table creation mechanism impedes the use of conventional database clusters. Services such as access control and data separation are difficult to provide when applications share a single table for multiple storage needs.

To overcome limitations such as these, native tables are divided into segments. Segments are logical mappings into native tables. Container 130 shows three segments 131, 132, and 133 while container 140 shows two segments 141 and 142. These figures are merely exemplary, the number of containers and segments is not limited. In typical scenarios, a cluster will contain few containers, perhaps as few as one, with each container hosting one or more segments (typically many). Segments do not need a specified size, but can grow as large as space in the container allows. If the containers themselves grow dynamically, the size of a segment is only limited by the amount of physical storage that can be provided.

To a client, segments appear to be full-fledged database tables. Access to segments occurs through an intermediary called a SmallTable server 110. Clients use conventional database access techniques to interact with segments, such as Structured Query Language (SQL), XQuery, or Datalog queries. Queries are sent to the SmallTable server, which modifies them to indicate the correct segment of the corresponding container as recognized and managed by the database cluster. The SmallTable server then runs the modified query against the container and returns the results to the client. Under this setup, only the intermediary needs to track the division between containers and segments. From the clients' perspective, the segments are actual database tables and containers can be ignored. From the database cluster's perspective, only the containers (native tables) need to be managed while logical divisions within those containers can be disregarded. The invention may be practiced with existing clients and database clusters which have no knowledge of the inventive features. The intermediary server can interoperate with clients as a normal database server and with the database cluster as a normal database client.

The intermediary server can run on any number of machines in any location, not just the single server pictured in this example. For instance, the SmallTable server can run on a cluster of machines in one or more data centers. It need not be a separate machine; the required functionality of a SmallTable server can run in software on any machine, including potentially machines in the database cluster or client devices. The functionality offered by a SmallTable server defines a logically distinct entity regardless of the underlying hardware configuration. In some cases, all the entities pictured may run on shared machines in a datacenter.

Mediating database accesses with the SmallTable server may improve database security. For instance, without the SmallTable server each client typically accesses the database directly. If the client has full access to the cluster database, it may read or write not only its own data but data from other applications, either accidentally or intentionally. The SmallTable server prevents this. Clients do not require any access rights to the cluster database; they send queries to the SmallTable server, which accesses the database on their behalf. The SmallTable server's unique key translation features only allows clients to access their own segments, preventing data leaks and corruption.

Further, this arrangement allows more flexible authentication mechanisms. The SmallTable server may access the cluster database using one authentication mechanism, such as a simple username and password. The SmallTable server can authenticate clients using one or more other authentication mechanisms, such as authentication certificates, digital signatures, or encrypted challenges. The SmallTable server can also offer different levels of access depending on the type of authentication and credentials presented. For instance, a client providing a name and password may be allowed read-only access to a subset of the segments, while a client providing a digital certificate may be allowed read and write access. This flexibility allows more nuanced access rights than the cluster database typically supports. Certain embodiments enforce these restrictions by disallowing direct access to containers by the clients. In such systems, all access to native tables used as containers is controlled by SmallTable servers. Clients may be allowed to directly access data in other native tables not used as containers, depending on the implementation.

Figure 2:
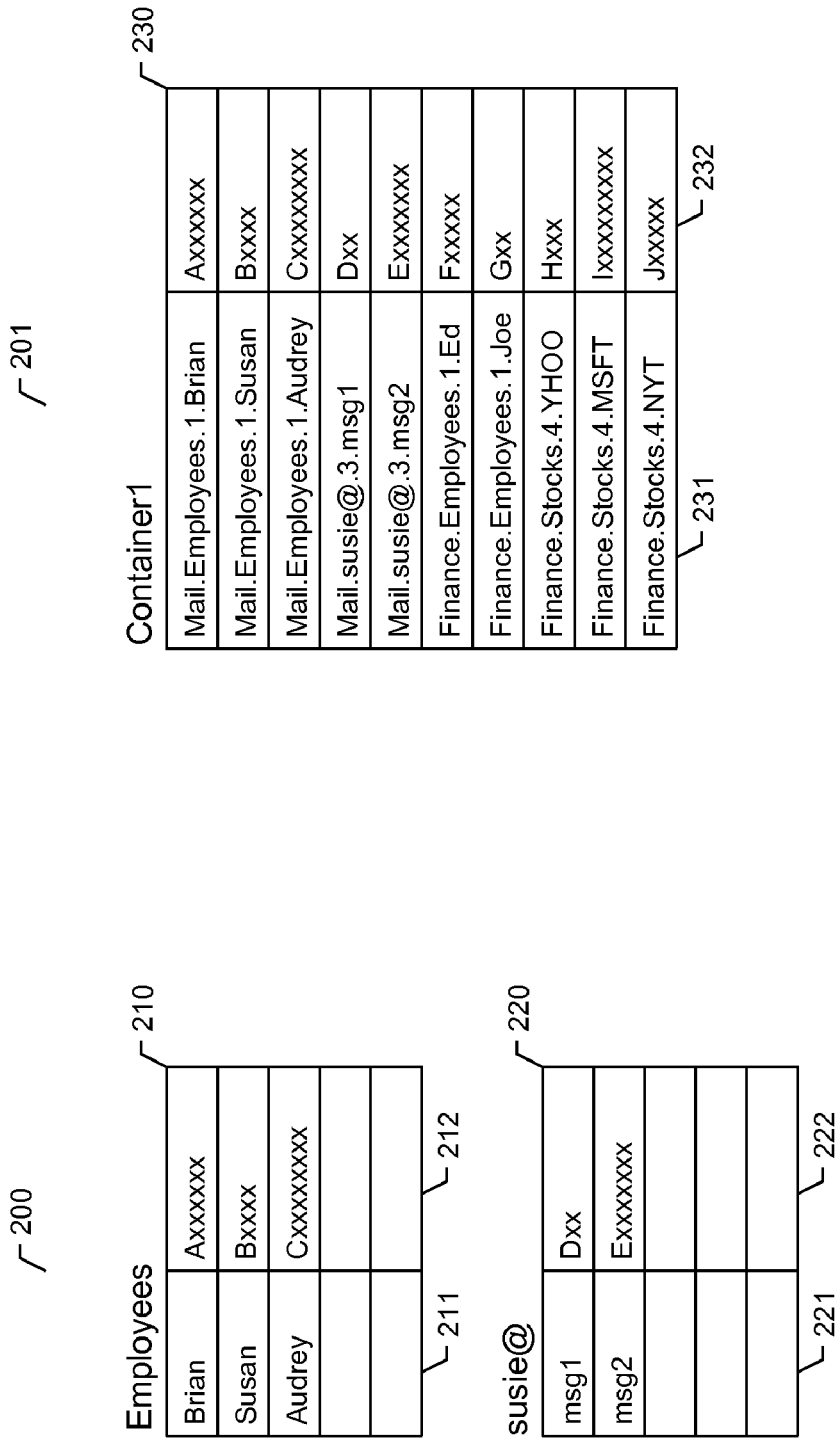
FIG. 2 illustrates the relation between segments and containers according to certain embodiments of the invention.

FIG. 2 illustrates the relation between segments and containers according to certain embodiments of the invention. View 200 presents the segment view of the data. An application such as Yahoo! Mail stores data in segments. To the Mail application, segments appear to be ordinary database tables which are created and accessed like any other database table. In the example, the Mail application has created two tables, Employees 210 and susie@ 220. Throughout this disclosure, saying an application created a table is a shorthand way of saying that the application sent a command to a database server requesting creation of that table, which the database server (in this case, the SmallTable server) then created. The Employees table contains data on employees assigned to the Mail division, with a primary key of employee name in column 211 and data in column 212. The primary key may comprise any values suitable for use as a database key. In this example, the primary keys consist of employee names: Brian, Susan, and Audrey. Similarly, the data column 212 may contain any type of data to be associated with the primary key. For example, data "Axxxxxx" assigned to the key Brian may contain data such as employee number, birth date, hiring date, salary, title, office location, assignments, performance reviews, etc.

Although a single data column is pictured, any number of data columns containing various data formats may be used. Alternately, a single column may be used to support multiple data types and values. For example, suppose data column 212 stores up to 255 string characters. Multiple data fields such as hiring date, position, and salary may be encoded into a string such as "10-18-2009: Director of Operations: $82,000" for storage in column 212. Some implementations may even support one or more data columns containing data of any size, such as unbounded strings.

In addition to employee data, the Mail application in this example also stores email data for its users. Rather than placing this data in the same table as the Employee data, standard data management practice suggests storing the email data in a separate location. In this example, the Mail application has created a table named "susie@" 220 for storing email sent to the address susie@yahoo.com associated with the employee Susan. Other employees and users might have their own similarly named tables not pictured in FIG. 2 for storing their mail. Table 220 contains primary key column 221 identifying each message received with a unique token: msg1, msg2, etc. Data column 222 contains data associated with each message, such as email headers and body.

Because tables 210 and 220 are segments, they do not exist as actual tables in the underlying database. View 200 is thus a logical view of the data as seen by the application. An intermediary server translates the logical view of segment tables into the actual storage in containers, shown in view 201. Container 230 is a table named Container1 in a cluster database such as Yahoo! Sherpa. Container1 stores data from multiple segments. Rows in segments are mapped to rows in containers by the intermediary server while preserving the segment distinctions. For instance, the embodiment pictured here translates the primary keys of a segment into distinct primary keys in the container.

According to a particular embodiment, the translated primary key format is App.Segment.Version.Key, where App is the name of the application, Segment is the segment table name, Version is a version number, and Key is the primary key in the segment. For instance, the key Brian in segment 210 of the diagram is mapped to Mail.Employees.1.Brian in container 230. When an application requests the data stored with key Brian in segment 210, the intermediary server translates the key to Mail.Employees.1.Brian and retrieves the data stored there. This produces data Axxxxxx from column 232, which is the data associated with the key Brian in column 212.

Other keys in segment 210 are similarly mapped as shown in column 231. The keys Susan and Audrey are mapped to Mail.Employees.1.Susan and Mail.Employees.1.Audrey, respectively. Container 230 also holds data from other segments. For instance, the keys msg1 and msg2 in segment 220 are mapped to Mail.susie@.3.msg1 and Mail.susie@.3.msg2 in column 231. In this example, this is the third version of the segment susie@. Version numbers will be discussed in more detail later. Putting the segment name in the container's primary key ensures that the contents of different segments owned by an application such as Mail remain distinct. If the first version of Mail's segment susie@ had a key named Brian, it would map to Mail.susie@.1.Brian in container 230, keeping it distinct from the Brian row of the Employees segment for Mail.

Container1 also contains data from segments created by other applications. For instance, an application Finance creates its own segment Employees (not shown) to keep track of the employees assigned to it. Keys from this segment map to Finance.Employees.version.key in Container1, such as Finance.Employees.1.Ed and Finance.Employees.1.Joe in column 231. Using the application name in the translated key allows separation between applications. Both Mail and Finance can have segments named Employees without risking data collisions in the database. If Finance also had an employee named Brian, it would be stored under the key Finance.Employees.1.Brian in Container1, keeping it distinct from the Brian entry in Mail's Employee segment. The Finance application may also have other segments, such as a segment named Stocks for storing current stock price data where the primary keys are stock ticker symbols. Keys such as YHOO, MSFT, and NYT in this segment map to the keys Finance.Stocks.4.YHOO, Finance.Stocks.4.MSFT, and Finance.Stocks.4.NYT in column 231. Thus Container1 can hold data from multiple segments created by multiple applications without data collisions occurring.

As seen, the Application and Segment portions of the translated key name are important for preventing name collisions. However, either may be optional in certain embodiments. For instance, if applications only require one data table (segment) in a particular scenario, then the Segment name may be optional. Similarly, if the Container only hosts segments from one application, the Application name may be dropped. Version numbers may also be unused or absent in some embodiments.

While the translated keys are shown here as strings formed by concatenating the various elements, other implementations are contemplated. For example, all or part of the translated primary key may be formed by computing a hash or other function on some or all of the constituent parts. Any of the application name, segment name, and version number could be combined in this way. The translated primary key may be something like a9x7d6c876.Brian instead of Mail.Employees.1.Brian, where the value a9x7d6c876 is formed by hashing "Mail.Employees.1" or some other arrangement of the application name, segment name, and version number. Although the segment primary key itself (here, Brian) may also be hashed during the translation, this should be avoided if searches on the segment primary keys are desired, such as searching for entries where the name ends with "an".

In some embodiments, the underlying container stores keys in sorted order. Under this configuration, rows belonging to a segment are stored contiguously in the container. This may improve performance when accessing large numbers of rows since the data are stored near each other, increasing locality of reference.

Figure 3:
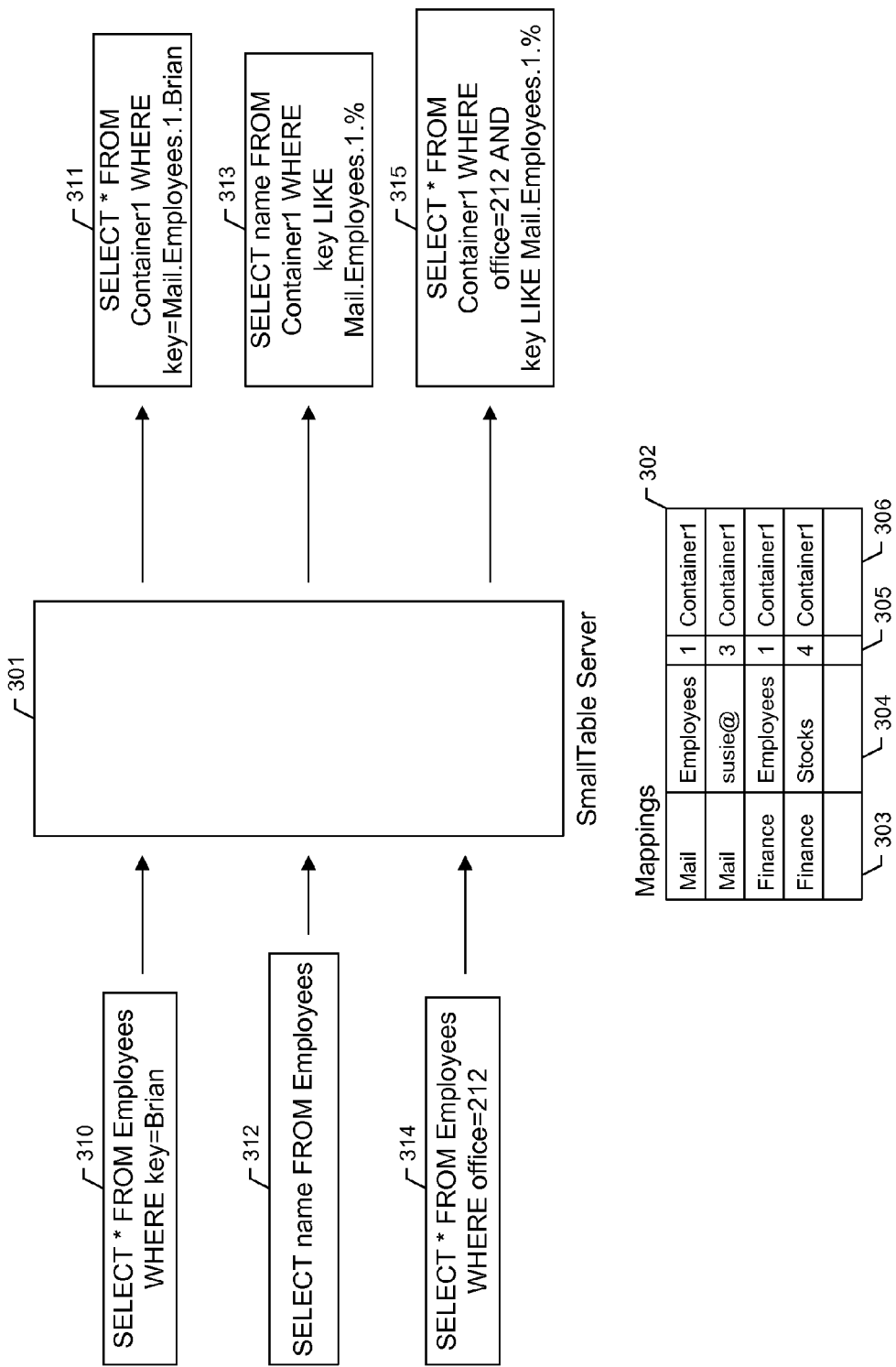
FIG. 3 illustrates how a SmallTable server processes incoming requests according to certain embodiments of the invention.

FIG. 3 illustrates how a SmallTable server processes incoming requests according to certain embodiments of the invention. A SmallTable server 301 receives a segment access request 310 from an application such as Mail. The request is formatted as a typical database query, such as an SQL statement. The query here indicates that the application wishes to access the segment table named Employees. The SmallTable server maintains a data structure 302 indicating the mappings between segments and containers. Although shown here in table format, data structure 302 may comprise any type of data structure suitable for lookups, including arrays, linked lists, trees, or hash tables. In this example, the data structure contains columns for the application name 303, segment name 304, version number 305, and container 306.

Knowing that request 310 came from the Mail application, the SmallTable server looks up the mapping information for a corresponding segment named Employees. It finds the entry for application Mail and segment Employees in the first row of 302. The corresponding entries in columns 305 and 306 indicate that the current version of this segment is 1 and it is stored in the container Container1. Using this information, the SmallTable server rewrites the query into a format the cluster database, which knows nothing about segments, will understand. The table portion of the query, "FROM Employees", is replaced with "FROM Container1". Similarly, container1 has no keys named Brian because segment keys are translated into different container keys. Thus the SmallTable server also translates the portion of the request "key=Brian" into "key=Mail.Employees.1.Brian", since that is the corresponding key in this example. The translated query 311 is sent to the cluster database and the results returned to the SmallTable server. The SmallTable server then cleans up the results, such as removing the "Mail.Employees.1." from the beginning of key names, before returning the results to the application.

Another request 312 is translated into request 313. As before, the table identifier in the SQL statement is translated from the segment name Employees to the container name Container1. Further, query 312 lacks a WHERE clause indicating which primary key to retrieve. When query 312 is run on a segment such as 210, the application expects every row from that segment to be returned. However, if no primary key is specified in the translated query, then every row in the container will be returned, including rows belonging to other segments. To avoid this and preserve the illusion of segments as actual database tables, a WHERE clause is added to translated query 313. Since the original query would retrieve every row from the corresponding Employee segment, the translated query requests rows in container1 where the key is Mail.Employees.1.%. Because % is a wildcard in SQL, this will retrieve all rows with keys that start with Mail.Employees.1. This translated query produces all the data rows from the Employees segment as the application expects.

If the original query already has a WHERE clause on a non-primary key column, a restriction of the primary key may be added. For instance, query 314 asks to retrieve entries from the Employee segment which have the number 212 stored in the "office" data column. Translated query 315 preserves this WHERE clause and adds "AND key LIKE Mail.Employees.1.%" to restrict the search to the proper segment.

In some embodiments, the query language used to interact with the SmallTable server may differ from the language used to interact with the cluster database. For example, SmallTable may interface with the database via SQL, but allow clients to specify their queries in Datalog or XQuery. In such instances, the query translation may require more than simply replacing key and table names, including possibly translating the entire syntax of a query. Methods for performing such translations will be readily appreciated by those skilled in the art.

In some embodiments, the mappings structure 302 is stored in the cluster database. For example, columns 303 and 304 could be combined into a primary key App.Segment uniquely identifying each segment, such as "Mail.Employees", "Mail.susie@", etc. The current version and container name for each key are then stored as associated data. Using this approach, the mappings data structure itself may be stored in the cluster database. The mappings data may have its own native table (container) in the database. Alternately, it could be stored as a segment in a specified container. For example, the SmallTable server could create a segment called Mappings by creating rows in Container) with keys of SmallTable.Mappings.id, where id is a segment identifier. Under this arrangement, the mapping data for the Employees segment of application Mail are stored under the key SmallTable.Mappings.Mail.Employees in Container1. The data associated with this key are the associated mapping data, e.g. the version number and container name where the Mail.Employees segment is located. This use of a container to store mappings data only requires the SmallTable server to store the mapping information for a single segment: the SmallTable.Mappings segment. Once the container location of that segment is known, the SmallTable server can look up the mappings data to find any other segments in the system.

According to some embodiments, version numbers allow applications to recreate segments quickly and easily. Applications may drop tables and recreate them when updating table formats or when dealing with cyclical data collection periods. For instance, a logging application may store log messages in a different table for each day of the week. When a new day such as Sunday begins, the application drops the existing Sunday table from last week and creates a new Sunday table for the current day. With traditional databases, this approach is often faster than clearing or deleting the entries from the existing Sunday table. However, because segments are simply logical mappings into physical containers, they can not be dropped in the same way as real tables. Without version numbers, creating a new segment Logging.Sunday would require deleting all the container entries with primary key Logging.Sunday.* to clear out the old data.

According to some embodiments, the SmallTable server uses segment version numbers to avoid this problem. For example, the first time the Logging.Sunday table is created, it has version number 1. The primary keys in the corresponding container begin with Logging.Sunday.1. When the next Sunday rolls around, the logging application issues an SQL command such as "DROP Sunday" to drop the Sunday table. The SmallTable server does not translate this command for the database cluster because the cluster only knows about containers, not segments such as Sunday. Since each container hosts multiple segments, dropping the container would lose data. But instead of deleting the rows in the container with the key Logging.Sunday.1.*, the SmallTable server simply marks the Logging.Sunday segment as dropped in its mappings structure. When the logging application issues the command to create a new Sunday table, the SmallTable server sees that the Logging.Sunday segment was dropped and increments the version number to 2. New data stored in the logging table will have primary keys starting with Logging.Sunday.2. This creates a separate namespace from the previous Sunday table, so the new data does not collide with the old data. The old data with keys.Logging.Sunday.1.* will be inaccessible to the logging application.

Using this approach, old data such as Logging.Sunday.1.* can be cleaned up at a more convenient time, such as with a nightly cleanup script during off-peak hours. The cost of recreating a table is extremely small: it simply requires updating one entry in the mappings structure, the same as creating a new table. This makes dropping and recreating segment tables highly efficient, in contrast to the high cost of creating new native tables in a cluster database.

In some embodiments, multiple copies of the mapping data may be used. For instance, there may be multiple SmallTable servers or a distributed cluster of SmallTable servers to spread the load among multiple machines. All such instances should agree on the current version number of a table. For example, if a SmallTable server 1 records the current version as 2, while a SmallTable server 2 records the current version as 3, then access to old, "dropped" data is available through server 1 for clients using that server. A variety of mechanisms can deal with this issue, including consensus protocols such as Paxos which resolve consensus issues in a network, lease-based protocols (e.g. every SmallTable server obtains a lease on a mapping record, and version numbers are only incremented after every server is notified or its lease has expired), or record locking protocols which obtain exclusive access to mapping structure entries before making changes. Numerous other approaches will be readily appreciated by those skilled in the art.

Figure 4:
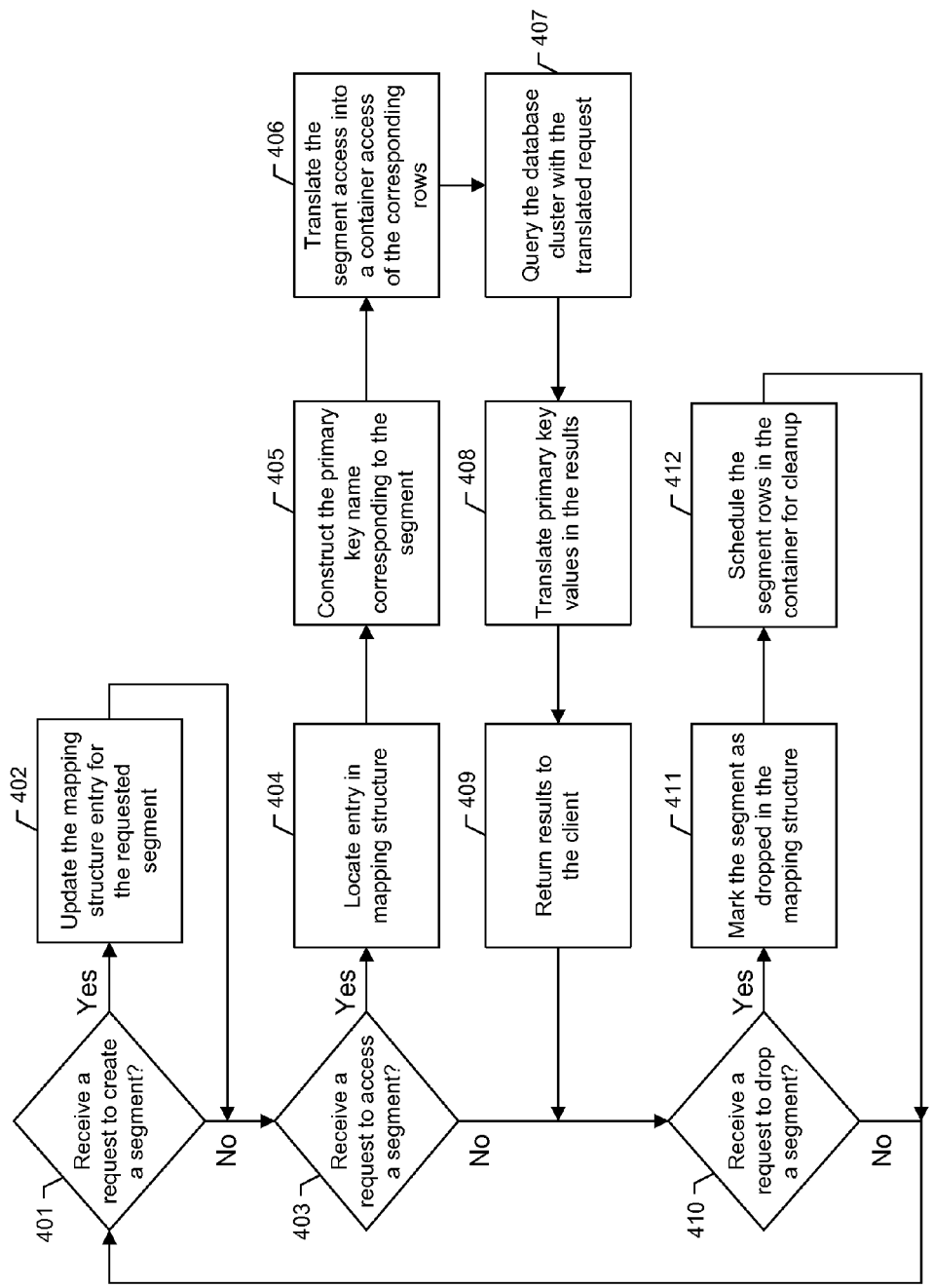
FIG. 4 presents a flowchart illustrating a method for practicing various embodiments of the invention.

FIG. 4 presents a flowchart illustrating a method for practicing various embodiments of the invention. It begins with a SmallTable server listening for requests to create a segment (401). When such a request is received, the SmallTable server updates an entry in the mapping structure for the requested segment (402). If the segment has not existed previously, the SmallTable server creates a new entry in the table, assigning the segment to a container and initializing a version number. If the segment was previously created and dropped, the dropped flag is cleared from the entry and the version number is incremented.

When at least one segment has been created, the SmallTable server can listen for requests to access a segment (403). Requests may come in the form of SQL commands issued on the segment. When a request is received, the SmallTable server looks up the entry in the mapping table corresponding to the segment (404). This entry indicates which container hosts the segment and the current version number. Using this data, the segment name, and the application name, the SmallTable server constructs the primary key name corresponding to the segment (405) as described elsewhere in this document.

The access query is then translated to run against rows in the corresponding container with primary key name(s) associated with this segment (406). The translated query is passed to the database cluster (407). Results from the query are then processed to translate primary key values back into a format the requesting application understands (408). For instance, this may involve removing the Application.Segment.Version prefix from primary keys in the result. After processing, the cleaned up results are returned to the requesting client (409).

The SmallTable server may also receive requests to drop a segment (410). When this occurs, the SmallTable server marks the segment as dropped in the corresponding mapping structure entry (411). Cleanup such as deleting rows from dropped versions of the segment can be scheduled for a later time (412). While the SmallTable server is running, it may continuously listen for requests to create (401), access (403), or drop (410) a segment. The process terminates when the cluster database is shut down or access to segments via the SmallTable server is no longer required.

Figure 5:
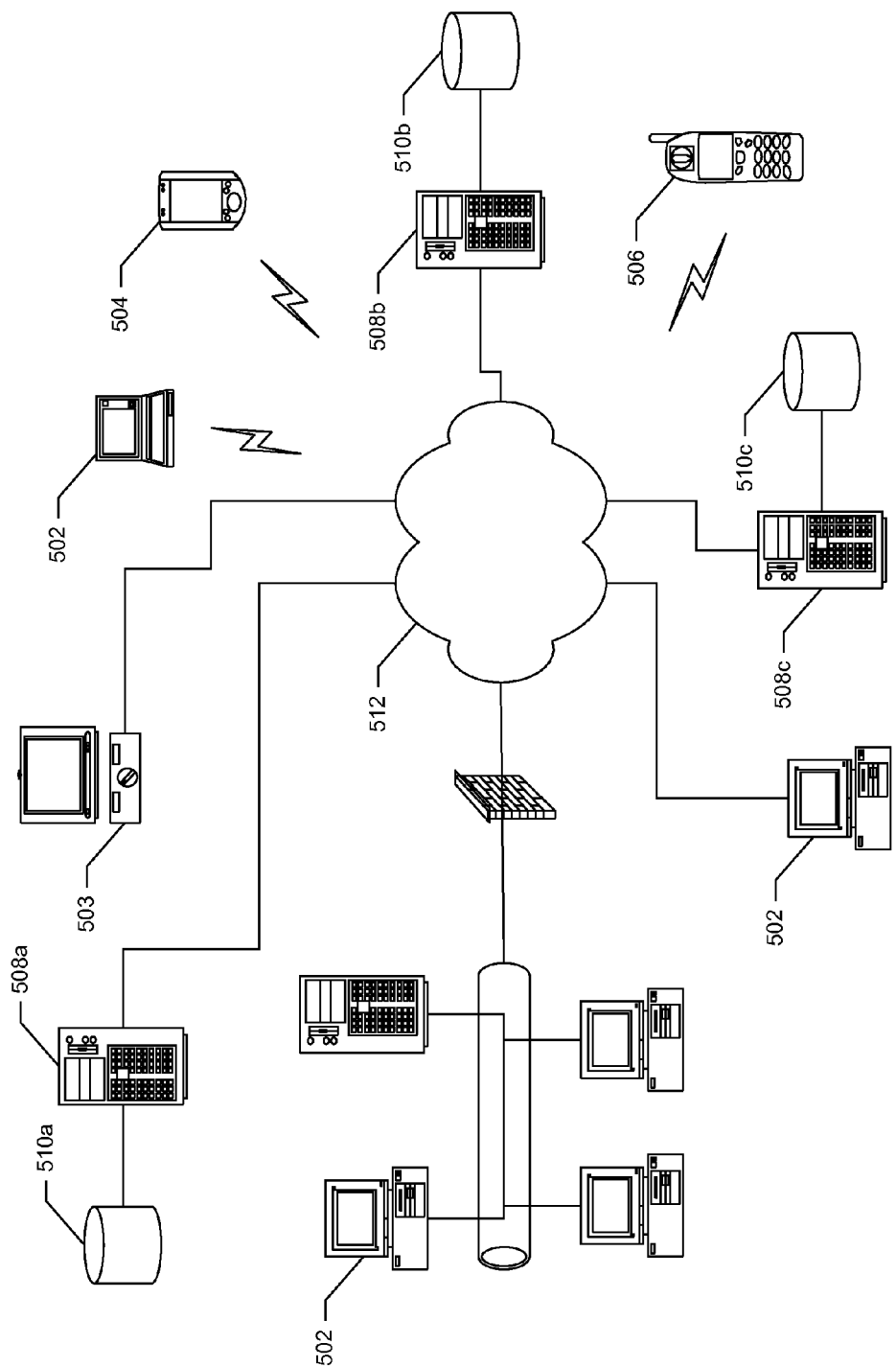
FIG. 5 depicts a computing environment in which embodiments of the invention may be practiced.

Embodiments of the present invention may be employed to collect and store data in any of a wide variety of computing contexts. For example, as illustrated in FIG. 5, implementations are contemplated in which the system interacts with a diverse network environment encompassing any type of computer (e.g., desktop, laptop, tablet, etc.) 502, media computing platforms 503 (e.g., cable and satellite set top boxes and digital video recorders), handheld computing devices (e.g., PDAs) 504, cell phones 506, or any other type of computing or communication platform. These devices may be producers or consumers of the data stored in segments. As producers, the devices would generate data stored in the database cluster. For example, a device might send an email to susie@yahoo.com, which the Mail application stores in the segment susie@. The devices may also indirectly produce the data by requesting services from applications in the cluster. For instance, a Search application may store the most requested search terms from queries issued by such devices in one or more segments. As consumers, the devices may retrieve data stored in a segment, such as the user susie accessing her email over the web using a mobile device.

According to various embodiments, data processed in accordance with the invention may comprise any type of data such as text strings or numerical values. For example, data representing a user's interaction with a web site or web-based application or service (e.g., the number of page views, access times, durations, etc) may be collected using any of a variety of well known mechanisms for recording a user's online behavior. User data may be mined directly or indirectly, or inferred from data sets associated with any network or communication system on the Internet. And notwithstanding these examples, it should be understood that such types of data are merely exemplary and that data may be collected in many ways from numerous sources.

Once collected and stored, the data may be further processed in some centralized manner. This is represented in FIG. 5 by servers 508*a-c* and data store 510*a-c* which, as will be understood, may correspond to multiple distributed devices and data stores. Each server-data store pair, such as 508*a* and 510*a*, may represent a single machine or a cluster of machines and storage devices hosted in a data center. Datacenters may operate independently as separate entities or in concert as a distributed cluster, such as providing the cluster database utilized by embodiments of the invention. The invention may also be practiced in a wide variety of network environments including, for example, TCP/IP-based networks, telecommunications networks, wireless networks, etc. These networks as well as the various communication systems from which connection data may be aggregated according to the invention are represented by network 512.

In addition, the computer program instructions with which embodiments of the invention are implemented may be stored in any type of computer-readable storage media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for partitioning a native table in a database comprising:
   receiving a first query directed to a logical table from an application on a client device, wherein the logical table is not recognized by the database;
   translating the first query into a second query in which the logical table is mapped into a portion of a native table recognized by the database using an entry corresponding to the application and the logical table in a mapping data structure;
   retrieving data from the portion of the native table using the second query; and
   returning the data to the client in a response, wherein the response is configured to appear responsive to the first query directed to the logical table.

2. The method of claim 1, wherein the translating further comprises renaming keys in the logical table into native table key names based on one or more of the logical table name, the application name, or a version number.

3. The method of claim 1 wherein the mapping data structure is stored as a logical table in the native table.

4. The method of claim 1 further comprising marking the mapping data structure entry as dropped when a request to drop the logical table corresponding to the entry is received, and scheduling the portion of the native table corresponding to the logical table for deletion at a later time.

5. The method of claim 1 further comprising incrementing the version number stored in the mapping data structure entry when the logical table corresponding to the entry is recreated.

6. The method of claim 1 further comprising using a first authentication mechanism to authenticate an intermediary server to the database, and using one or more second authentication mechanisms to authenticate clients to the intermediary server.

7. A system for partitioning a native table in a database comprising one or more computing devices configured to:
   receive a first query directed to a logical table from an application on a client device, wherein the logical table is not recognized by the database;
   translate the first query into a second query in which the logical table is mapped into a portion of a native table recognized by the database using an entry corresponding to the application and the logical table in a mapping data structure;

retrieve data from the portion of the native table using the second query; and return the data to the client in a response, wherein the response is configured to appear responsive to the first query directed to the logical table.

8. The system of claim 7, wherein the translating further comprises renaming keys in the logical table into native table key names based on one or more of the logical table name, the application name, or a version number.

9. The system of claim 7 wherein the mapping data structure is stored as a logical table in the native table.

10. The system of claim 7 further configured to mark the mapping data structure entry as dropped when a request to drop the logical table corresponding to the entry is received, and schedule the portion of the native table corresponding to the logical table for deletion at a later time.

11. The system of claim 7 further configured to increment the version number stored in the mapping data structure entry when the logical table corresponding to the entry is recreated.

12. The system of claim 7 further configured to use a first authentication mechanism to authenticate the system to the database, and use one or more second authentication mechanisms to authenticate clients to the system.

13. The system of claim 7 further comprising a database cluster configured to return data from the native table responsive to the second query.

14. A computer program product for partitioning a native table in a database, comprising at least one non-transitory computer-readable medium having computer program instructions stored therein which are configured to cause a computer device to:

receive a first query directed to a logical table from an application on a client device, wherein the logical table is not recognized by the database;

translate the first query into a second query in which the logical table is mapped into a portion of a native table recognized by the database using an entry corresponding to the application and the logical table in a mapping data structure;

retrieve data from the portion of the native table using the second query; and return the data to the client in a response, wherein the response is configured to appear responsive to the first query directed to the logical table.

15. The computer program product of claim 14 wherein the translating further comprises renaming keys in the logical table into native table key names based on one or more of the logical table name, the application name, or a version number.

16. The computer program product of claim 14 wherein the mapping data structure is stored as a logical table in the native table.

17. The computer program product of claim 14 wherein the computer program instructions are further configured to cause the device to mark the mapping data structure entry as dropped when a request to drop the logical table corresponding to the entry is received, and schedule the portion of the native table corresponding to the logical table for deletion at a later time.

18. The computer program product of claim 14 wherein the computer program instructions are further configured to cause the device to increment the version number stored in the mapping data structure entry when the logical table corresponding to the entry is recreated.

19. The computer program product of claim 14 wherein the computer program instructions are further configured to cause the device to use a first authentication mechanism to authenticate the system to the database, and use one or more second authentication mechanisms to authenticate clients to the system.

* * * * *